United States Patent [19]

Ham et al.

[11] Patent Number: 5,195,609

[45] Date of Patent: Mar. 23, 1993

[54] AUTOMATICALLY RETRACTABLE STEP

[75] Inventors: Brian T. Ham; Keith T. Willoughby, both of Jacksonville, Fla.

[73] Assignee: Aircraft Products Company, Jacksonville, Fla.

[21] Appl. No.: 828,024

[22] Filed: Jan. 30, 1992

[51] Int. Cl.⁵ .............................................. B60R 3/00
[52] U.S. Cl. ...................................... 182/90; 280/166
[58] Field of Search .............................. 182/90, 91, 92; 280/163, 164.1, 166; 312/235.1

[56] References Cited

U.S. PATENT DOCUMENTS

| 2,217,570 | 10/1940 | Stroup | 312/235.1 X |
| 3,517,942 | 6/1970 | Cuffe et al. | 280/166 |
| 3,584,704 | 6/1971 | Eckmann | 182/90 |
| 3,671,058 | 6/1972 | Kent | 280/166 |
| 3,861,713 | 1/1975 | McKee | 280/166 |
| 4,108,458 | 8/1978 | Owens | 280/166 |
| 4,180,143 | 12/1979 | Clugston | 182/91 |
| 4,462,486 | 7/1984 | Dignan | 182/91 |

Primary Examiner—Karen J. Chotkowski
Attorney, Agent, or Firm—John G. Gilfillan; Susan A. Capello

[57] ABSTRACT

A retractable step is movable from a position located in a cavity to an extended position located outside of the cavity. The invention provides for a latching facility to hold the step in the extended position against the bias of a retracting spring. A person standing on the step, exerting a downward force thereon disengages the latching facility. As the downward force is removed from the step, the step automatically retracts in response to the bias of the retracting spring.

8 Claims, 3 Drawing Sheets

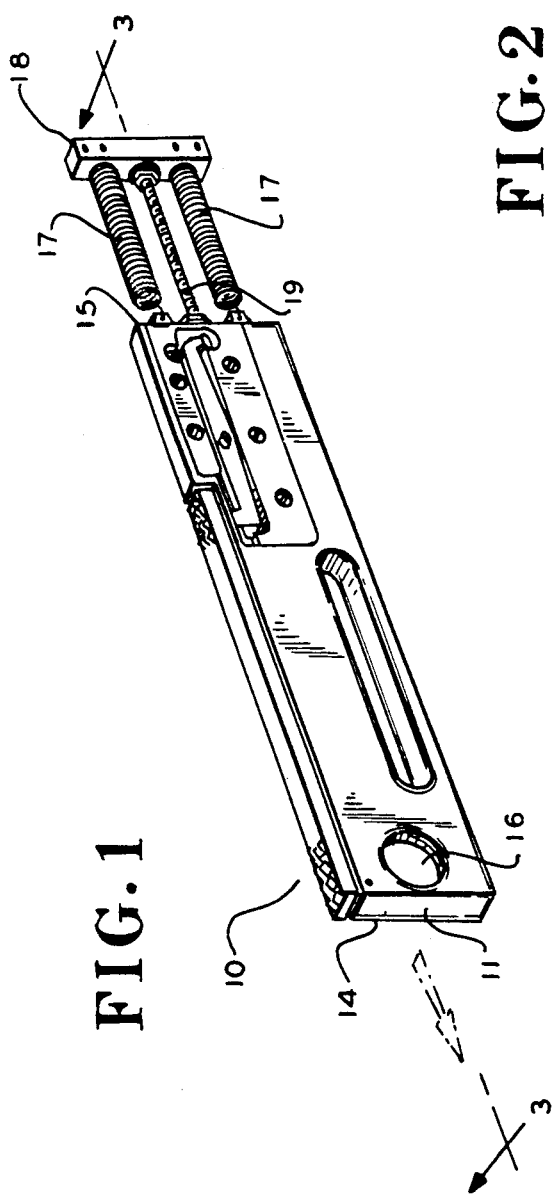
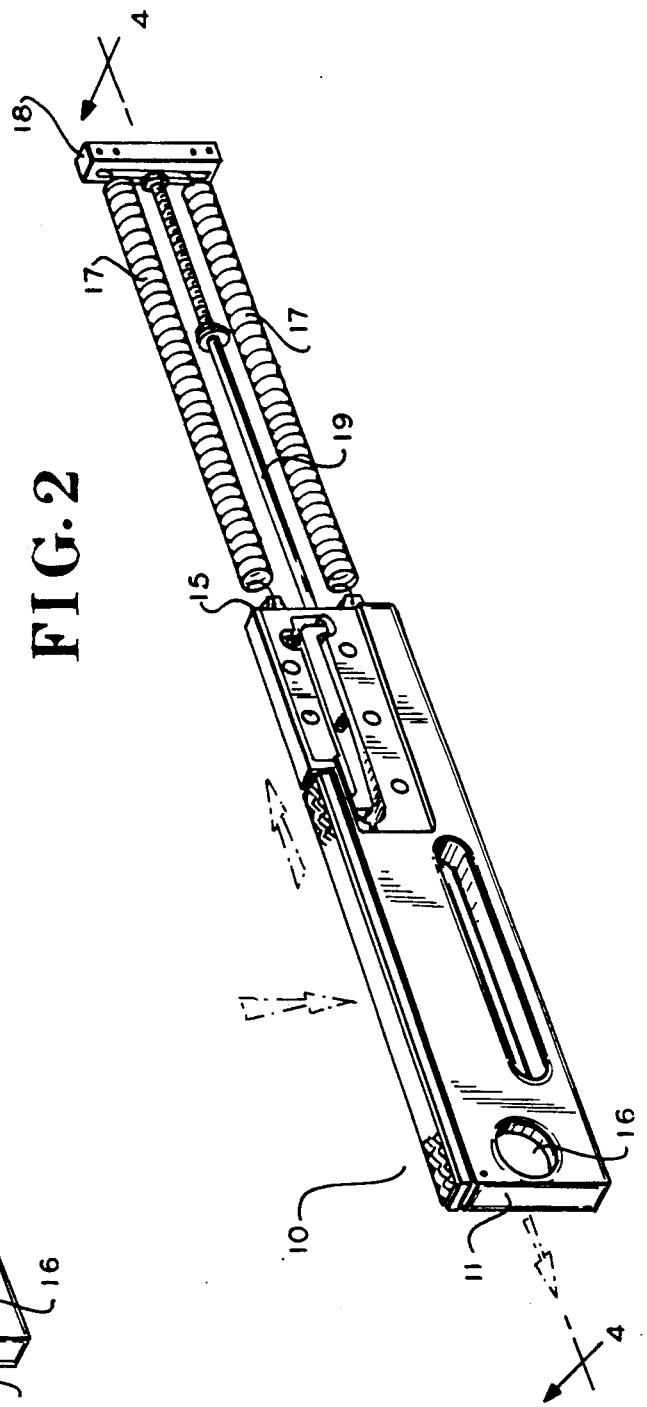
FIG. 1
FIG. 2

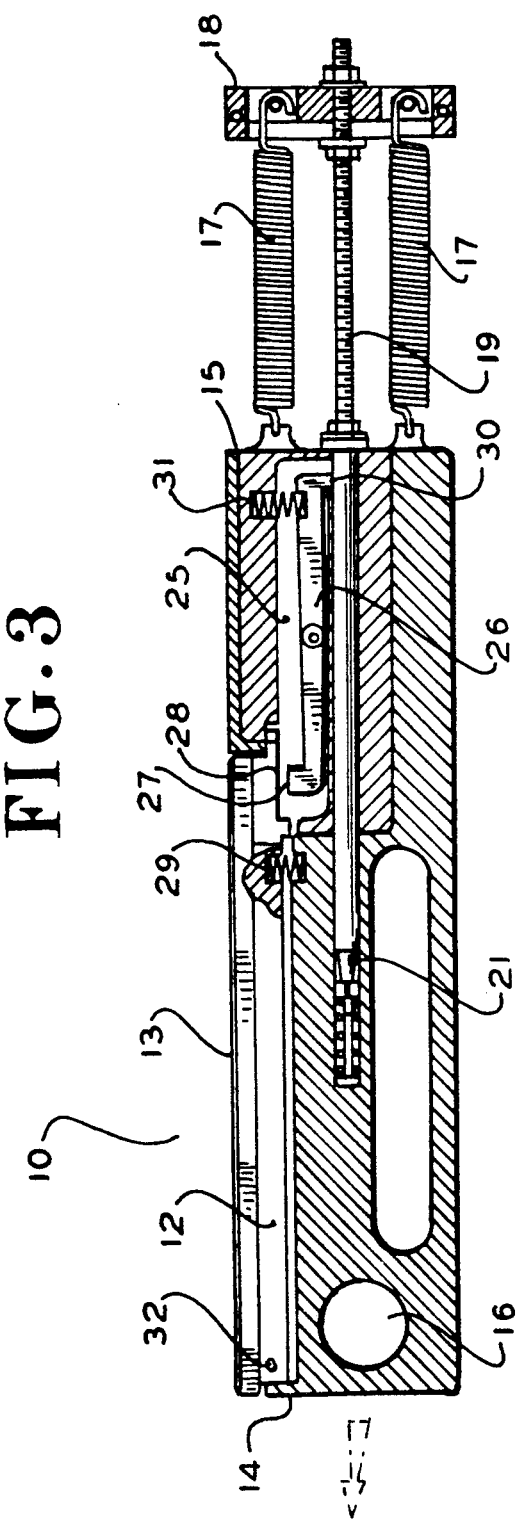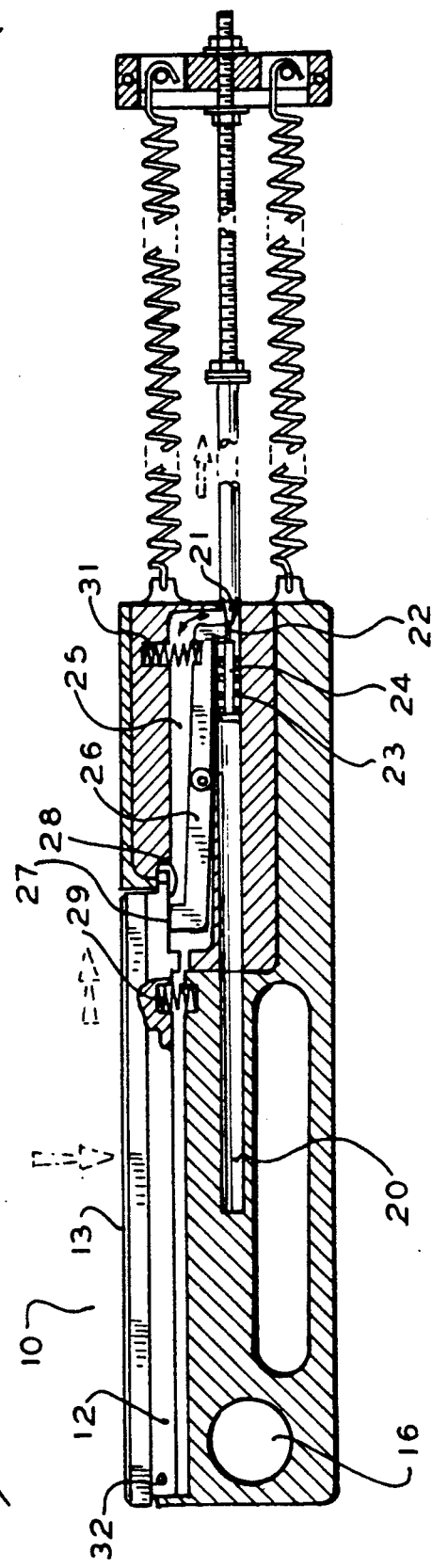

AUTOMATICALLY RETRACTABLE STEP

BACKGROUND OF THE INVENTION

The present invention relates to an automatically retractable step, particularly such a step which is usable in the galley of an airplane.

The galley of an airplane does not have much working or moving space because of the high density of equipment and supplies therein. Also, numerous pieces of equipment, implements and supplies are stowed from ceiling to floor. The latter fact requires that some sort of step or elevating device be available to permit access to elevated items. The former fact requires that the step be selectively stowable.

Recessable steps for use in a galley of an aircraft are known in the art. However, prior art recessable steps are required to be manually moved back to their stowed positions in a recessed compartment after they have been manually pulled out thereof.

The main problems recognized by users of these steps are (a) that they must be manually deployed, (b) that they must be manually stored, and (c) that they may inadvertently be left in the deployed or extended position and thus become a hazard to personnel working in the galley. Any step which ameliorates the foregoing should also take up little space—which is at a premium in an airplane—be lightweight and be simple to use and maintain.

The present invention provides for an improvement of prior art recessable steps, the improvement being a step which will automatically retract after being used and which meets the criteria of being small in size, light and simple.

The inventors recognize that such a step would be useful for many non-aircraft-related applications, for example, in the home use, or boats, in recreational vehicles, or in any place where there is a recurring, temporary need to reach elevated areas beyond the reach of a person.

SUMMARY OF THE INVENTION

The recessable step is movably located within a cavity. The step can be extended to reside outside of the cavity. The improvement provides for a latching facility for holding the step in the extended position against the bias of a step retracting facility such as a spring. Once sufficient downward force is applied to the step, as by a person standing thereon, the latching facility is disengaged so that when the downward force is removed, the step is automatically retracted under the bias of the retracting facility, thus eliminating the need for the step to be manually retracted by the user.

BRIEF DESCRIPTION OF THE DRAWINGS

FIG. 1 is a front elevational view of a automatically retractable step embodying our invention in the retracted position;

FIG. 2 is a front elevational view of a automatically retractable step embodying our invention in the extended position;

FIG. 3 is a side elevational view shown in section, the section taken essentially through the central axis of FIG. 1 of the retractable step in the retracted position;

FIG. 4 is a side elevational view shown in section, the section taken essentially through the central axis of FIG. 1 of the retractable step in the extended position.

DETAILED DESCRIPTION

Figure 5:
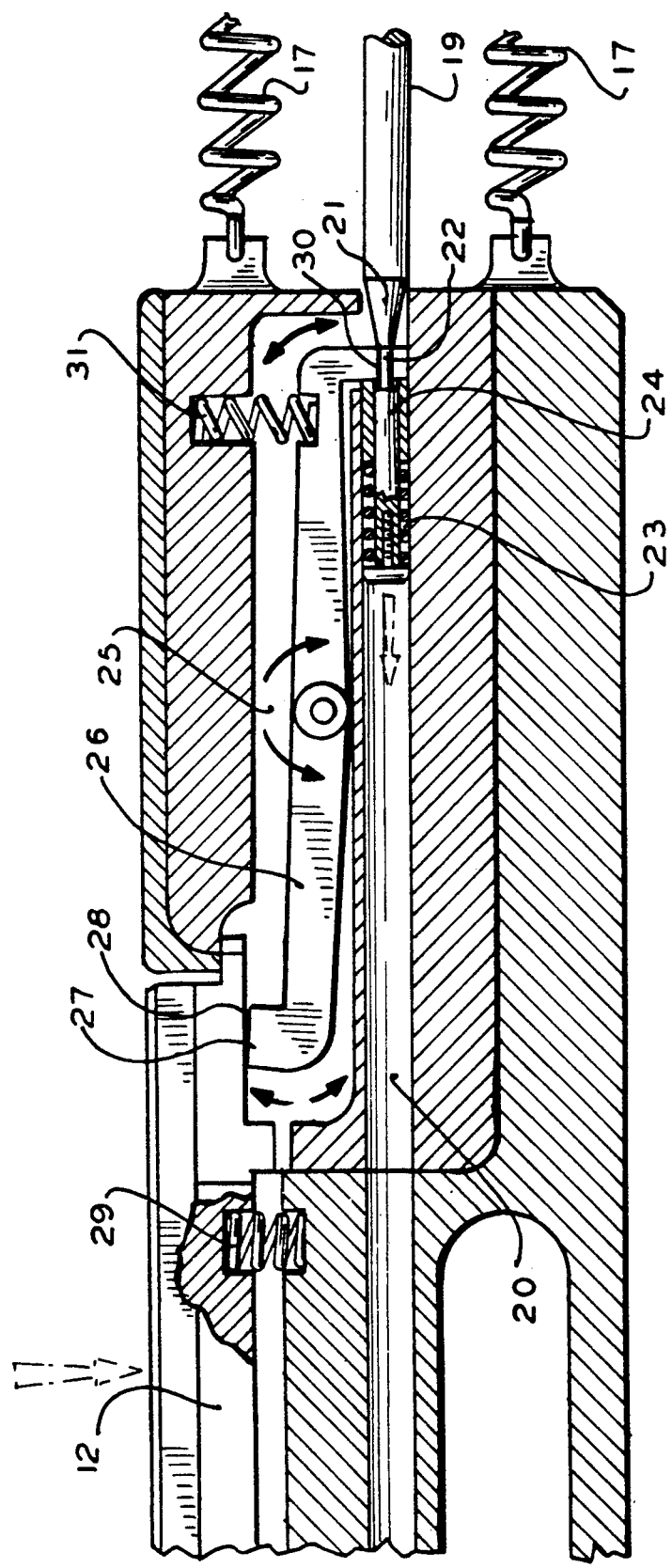
FIG. 5 is an enlarged side elevational view of the retractable step in the extended position as shown in FIG. 4.

Referring to the drawings, there is shown an automatically stowed step as designated generally by reference numeral 10. The automatically stowed step 10 is provided with a step frame 11, having a platform 12 pivotally attached to the top of the step frame 11. The platform 12 has an upper surface 13 on to which a person may stand to gain access to elevated areas of a cabinet assembly.

The step frame 11 has a forward end 14 and a rearward end 15. The forward end 14 of the step frame 11 has a manually engageable portion, such as a finger hole 16 cut therein, which permits the step 10 to be pulled from the cavity (FIG. 3) and to its fully extended position (FIG. 4). Attached to the rearward end 15 of the step frame 11 is a facility 17 for biasing the automatically stowed step 10 into the cavity, in a stowed position (FIG. 3). The biasing facility 17, such as the spring 17 shown, is attached between the frame 11 and a mounting bracket 18, which is permanently attached within the cavity.

Also attached to the mounting bracket 18 is a stationary member 19 which extends into a horizontal cavity 20 which extends toward the frontward end 14 of the step frame 11. A forward portion of the stationary member 19 narrows, forming a conically shaped section 21 which then connects to a narrow section or latch receiving surface 22. The forwardmost portion of the stationary member 19 includes a bias facility 23 for biasing a tube portion 24 over the narrow section 22 such that the narrow section 22 is covered by the tube portion 24 which in the nonlatched position meets the conical shape section 21.

Located above the horizontal cavity 20 is a separate lever cavity 25 having a forward section which is open to the lower surface 28 of platform 12 and a rearward section which is open to the stationary member 19 in the horizontal cavity 20. Within the lever cavity 25 is a pivotal lever 26 having a force receiving surface 27 on one end of the lever toward the forward section. The force receiving surface 27 of the pivotal lever 26 is held off the lower surface 28 of the platform 12 by an upward biasing spring 29. The other end of the pivotal lever 26 has a latch surface 30 which is pressed downward by downward biasing spring 31. The pivotal lever 26 is being pressed downward on the stationary member 19 as the step frame 11 is being deployed from the cavity, once the conical shape section 21 passes under the latching surface 30, the latching surface 30 catches the edge of the tube portion 24 and prevents it from passing thereby exposing the narrow section (latch receiving surface) 22. The latching surface 30 is now locked in place as it is engaged between the conical shape section 21 and the tube portion 24 keeping the step frame 11 from either extending any further and from retracting (FIG. 4).

Once the step frame 11 has been fully extended and the latching surface 30 is in place locking the step frame 11 in the fully extended position the upper surface 13 may be used as a step to reach high areas of the cabinet assembly. The weight of a person stepping on the upper surface 13 causes the platform 12 to pivot on pivot pin 32 and depress the upward biasing spring 29 pressing the lower surface 28 against the force receiving surface 27 which pivots the pivotal lever 26 so that the latching surface 30 is lifted upward against the downward biasing spring 31; this action allows the bias means 23 to bias the tube portion 24 over the narrow portion 22 and against the conical shape section so that once the person's weight is removed, the latching surface 30 will not relock. The means for biasing 17 now retracts the step frame 11 into the cabinet cavity.

We claim:

1. An automatically stowed step associable with a cabinet assembly, a person standing on said step when deployed being able to gain access to elevated areas of the assembly, said step comprising:
   (a) a platform having an upper surface on which a person may stand, the platform being movable into and out of a cavity in the assembly;
   (b) means for biasing the platform into the cavity in a normal stowed position;
   (c) means responsive to a selected amount of movement of the platform out of the cavity and into a deployed position for latching the platform against movement into the cavity by the biasing means; and
   (d) means responsive to the weight of a person standing on the upper surface for releasing the latching means, the biasing means being unable to move the platform into the cavity as long as the person stands on the upper surface, the biasing means moving the platform back into the cavity when the person steps off the upper surface.

2. An automatically stowed step as in claim 1, wherein:
   the latching means includes:
      a pivotal lever having a force receiving surface on one end and a latching surface on the other end, in the deployed position of the platform the force receiving surface of the lever engages the platform and the latching surface of the lever holds the platform against movement into the cavity.

3. An automatically stowed step as in claim 2, wherein:
   the latching means further includes:
      a biasing means for biasing the latching surface downward against the latch receiving surface, holding the platform against movement into the cavity.

4. An automatically stowed step as in claim 3, wherein:
   the latching means further includes:
      a stationary member along which the latching surface is drawn until the latching surface engages the latch receiving surface, holding the platform against movement into the cavity.

5. An automatically stowed step as in claim 4, wherein:
   the latch receiving surface includes:
      a narrow section of the stationary member, which narrow section is covered by a tube portion,
      an edge of the tube portion is engaged by the latching surface of the pivotal lever as the step is moved into the deployed position, thereby exposing the narrow section, the latching surface which is biased downward, engages both the edges of the tube portion and the wider section of the stationary member, which act to hold the platform against movement into or further out of the cavity.

6. An automatically stowed step as in claim 2, wherein:
   the latch releasing means includes:
      the force receiving surface of the pivotal lever which meets the platform, wherein the weight of a person on the upper surface of the platform presses the platform against the force receiving surface of the pivotal lever causing the release of the latching means.

7. An automatically stowed step as in claim 6, wherein:
   the latch releasing means further includes:
      the latching surface is pivoted upward away from a latch receiving surface causing the release of the latching means.

8. An automatically stowed step as in claim 7, wherein:
   the latch receiving surface includes:
      a stationary member having a narrow section which narrow section is being covered by a tube portion and being exposed when the latching surface of the pivotal level engages an edge of the tube portion and an edge of a wider section of the stationary member when the step is moved into the deployed position and locked in that position;
      the latching surface is pivoted upward and is no longer in contact with the edge of either the tube portion or the wider section of the stationary member; the tube portion is biased by a spring means to cover the narrow section preventing the latching surface from relocking.

* * * * *